(No Model.)
G. F. TUTTLE.
GRADUATED SCALE.
No. 291,429. Patented Jan. 1, 1884.
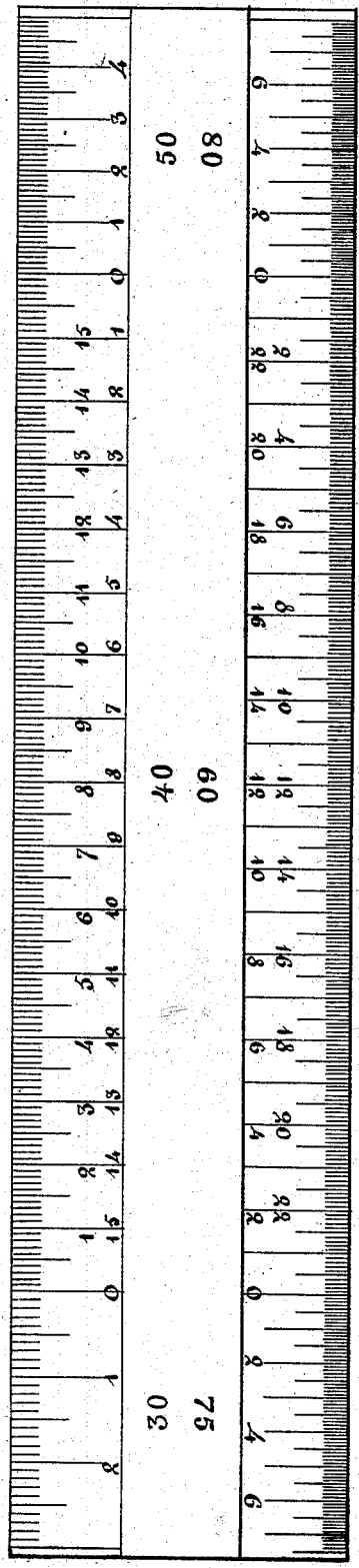
WITNESSES:
C. Neveux
C. Sedgwick
INVENTOR:
G. F. Tuttle
BY Munn & Co.
ATTORNEYS.

UNITED STATES PATENT OFFICE.

GEORGE F. TUTTLE, OF NEWARK, NEW JERSEY.

GRADUATED SCALE.

SPECIFICATION forming part of Letters Patent No. 291,429, dated January 1, 1884.

Application filed September 18, 1883. (No model.)

*To all whom it may concern:*

Be it known that I, GEORGE F. TUTTLE, of Newark, in the county of Essex and State of New Jersey, have invented a new and Improved Graduated Scale, of which the following is a full, clear, and exact description.

In the graduated scales made heretofore the inch is divided into quarters, eighths, sixteenths, &c.—that is, in scales dependent on each other.

The object of my invention is to provide a new and improved scale in which the linear unit—such as inch, centimeter, &c.—is divided in various fractional parts, so that the graduated scale can be used for measuring dimensions of various independent scales.

The invention consists in a graduated scale having its edges divided into lineal units, and the said lineal units divided into independent subdivisions, so that the scale can be used for measuring dimensions drawn to different scales.

Reference is to be had to the accompanying drawing, forming part of this specification, in which an enlarged face view of one form of my improved graduated scale is shown.

The scale A, made of wood, metal, ivory, bone, celluloid, or other suitable material, can be provided with one or more graduated edges, two such edges being provided in the scale shown. The zero-points are one inch from each end of each longitudinal edge, and the space between the zeros is divided into inches, which are subdivided into four and eight parts each, the eighths of inches being divided into five parts each, so that each smallest subdivision is one-fortieth of an inch. Of the end inches the one at the left-hand end is divided into three, six, and thirty parts, so that the smallest subdivision will be one-thirtieth of an inch. The other end inch is divided into five, ten, and fifty parts, so that the smallest subdivision will be one-fiftieth of an inch. On the other edge the left-hand end inch is divided into fifteen parts, each of which is divided into five parts, so that the smallest subdivision will be one seventy-fifth of an inch. The right-hand end inch is divided into eight, sixteen, and eighty parts, so that the smallest subdivision will be one-eightieth of an inch. The space between the zeros is divided into six, twelve, and sixty parts, so that the smallest subdivision will be one-sixtieth of an inch. The scale thus has the inch divided into thirty, forty, fifty, sixty, seventy-five, and eighty parts.

The scale is used in the following manner: If a drawing is on a scale of one hundred feet to the inch, the fiftieth scale is used. If the number of feet is even—for instance, two hundred and forty—ten inches are measured off from the zero toward the left, and forty feet (equal to twenty on the fiftieths scale) are measured off on the same. If the number is odd—for instance, one hundred and thirty-five feet—which cannot be measured on the fiftieth scale, ten are measured on the fiftieths scale, and one hundred and twenty-five; equal to one and one-fourth inch, are measured off toward the left of the right-hand zero. The two dimensions together represent one hundred and thirty-five feet. If, on the eightieth scale, one hundred and seventy feet are to be measured, two inches, equal to one hundred and sixty feet, are taken on the scale from the right-hand zero toward the left, and one-eighth of an inch, equal to ten feet, is taken on the right-hand end inch, and so on for the different scales. One rule or graduated scale can thus be used for drawings made to different scales. Much time is thus saved, and much delay and numerous mistakes are avoided.

I have described my invention as being applicable to an inch scale; but it is evident that centimeters, meters, &c., can be subdivided in a like manner, and the scale constructed as described.

Having thus fully described my invention, I claim as new, and desire to secure by Letters Patent—

1. A graduated scale having a zero one linear unit or part thereof, of any standard measure, from each end, and having the space between the zeros, and also the end linear units, divided into different and independent subdivisions on one and the same edge of the scale, substantially as herein shown and described.

2. A graduated scale having a zero one lineal unit from each end of each graduated edge, the end units being divided into thirty, fifty, seventy-five, and eighty parts, respectively, and the units between the zeros being divided into forty and sixty parts, respectively, substantially as herein shown and described.

GEORGE F. TUTTLE.

Witnesses:
OSCAR F. GUNZ,
C. SEDGWICK.